Dec. 9, 1958  C. O. SCHMIDT, JR  2,863,166
HIDE PULLER
Filed May 31, 1956

INVENTOR.
CARL OSCAR SCHMIDT, JR.
BY
Warren Kinney Jr
ATTORNEY

United States Patent Office 2,863,166
Patented Dec. 9, 1958

2,863,166

HIDE PULLER

Carl Oscar Schmidt, Jr., Wyoming, Ohio, assignor to The Cincinnati Butchers' Supply Company, Cincinnati, Ohio, a corporation of Ohio Application May 31, 1956, Serial No. 588,306

10 Claims. (Cl. 17—21)

This invention relates to a hide stripper, or apparatus for removing the hide from animal carcasses. The device referred to is adapted particularly for use in abattoirs or meat packing plants wherein the processing of animal carcasses is performed on a large scale, and demands production at high speed with maximum efficiency.

An object of the invention is to provide a hide stripper of simplified form, which is inexpensive to manufacture and operate.

Another object is to provide a simplified hide stripper which detaches the hide from a carcass to a greater degree than will other forms of strippers, and with the added advantage that the power requirement for operating the apparatus is reduced to an absolute minimum.

A further object of the invention is to provide a hide stripper of improved design which requires for its operation a minimum of floor space, and a minimum amount of skilled labor.

Another object is to provide an improved hide stripper which may be mounted with ease on rollers or other tractional means, if desired, so as to move with a carcass suspended from a continuously advancing conveyor, while performing the stripping operation.

These and other objects are attained by the means described herein and illustrated upon the accompanying drawing, in which.

The character 4 indicates an animal carcass in horizontal cross-section, as it might appear while suspended by the hind legs from an overhead movable conveyor. In most packing plants, the carcass is advanced by the conveyor from one operating station to another, each station being equipped to perform some particular operation upon the carcass. The station with which the present invention is concerned is the hide pulling or stripping station, at which the hide is removed from the carcass. At this station, or in advance thereof, the carcass is preliminarily slitted up the belly lengthwise thereof, this being done manually, and as part of this operation the hide at opposite sides of the slit is undercut or partially severed to provide hide flaps 6 and 8. Also at this time the hide is manually detached from the legs of the animal.

Figure 1:
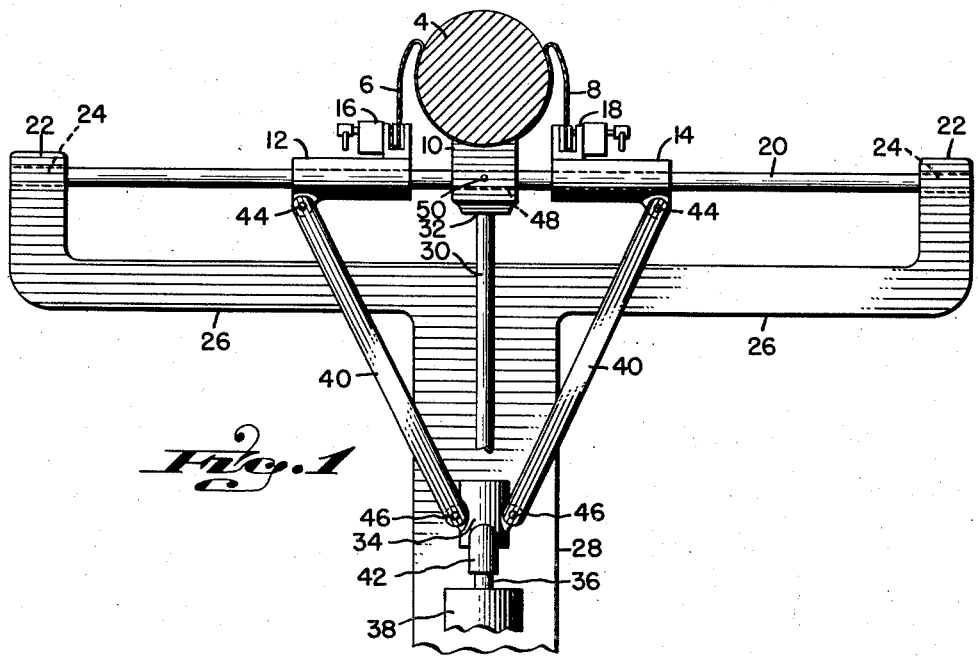
Fig. 1 is a top plan view of the improved hide stripper, shown in position to initiate the hide stripping operation.

The carcass prepared as above stated is brought into proximity with the hide stripper, with the backbone of the animal resting against a back rest 10, the back rest being stationary with relation to other parts of the stripping device. The position of the carcass just stated is illustrated upon Fig. 1. After so positioning the carcass against the back rest, the attendant secures the hide flaps 6 and 8 to the pullers 12 and 14 located at opposite sides of the back rest. The attachment may be effected in any suitable manner, preferably by means of some form of quick-acting clamps, although in the example illustrated the clamps are shown quite conventionally at 16 and 18. The form of clamp employed is a matter of immateriality to the invention.

Figure 2:
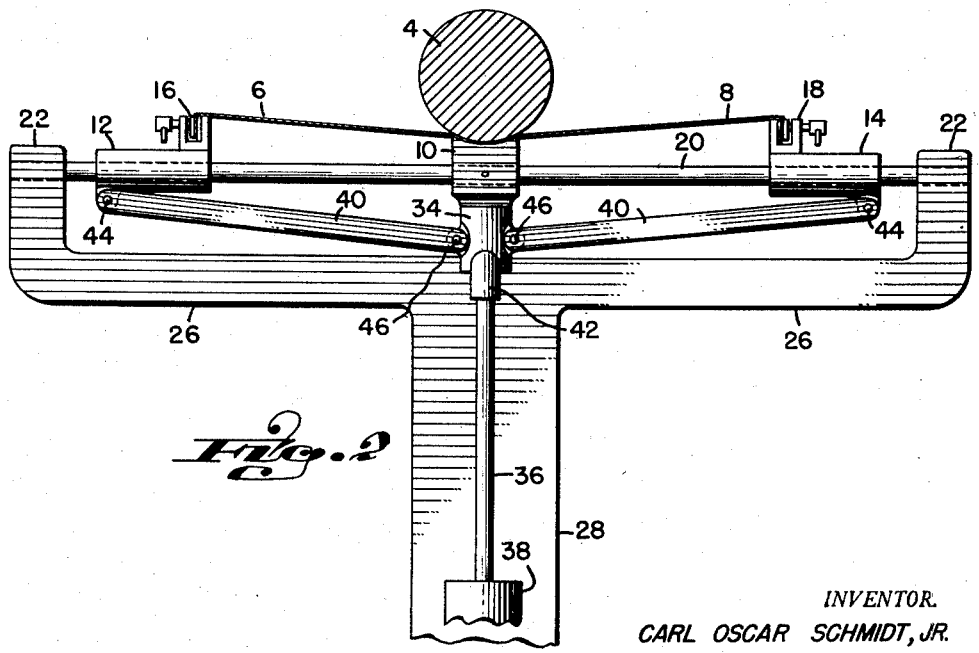
Fig. 2 is a view similar to Fig. 1, showing the condition of the device upon completion of the stripping operation.

The puller 12 and 14 may be in the form of slides or sleeves shiftable along a rigid bar or rod 20 in opposite directions simultaneously, to strip the hide from the carcass as shown in Fig. 2. When the pullers are extended to the extreme outer limit of travel, in accordance with Fig. 2, the hide will have been stripped off to the extent that only the backbone area thereof remains attached to the carcass. Final severance of the hide at the backbone may be performed as a separate manual operation after the cascass has been released from the stripping device.

Means are provided for rigid support of the guide bar 20 in a substantially horizontal plane. Such means may comprise a pair of spaced brackets 22 to which opposite ends of the bar 20 are fixed. The mountings at the rod ends may be of any appropriate character, for example, the brackets may be bored in alignment as at 24 to receive and hold the bar ends against movement. The brackets may be supported by aligned arms 26 extending laterally from a stationary frame member 28 of the apparatus located midway between the brackets 22. The frame member provides a mount for the back rest 10, which back rest may be fixed to a rigid brace shaft 30 at its forward end 32, the rear end of said shaft being in turn fixed to the frame member 28 at a location, not shown, remote from the back rest. The shaft 30 may serve as a guide along which may reciprocate the crosshead 34 of a piston rod 36 activated by a hydraulic cylinder 38 of the double-acting type. As will be understood, the crosshead may be bored longitudinally or in the direction of piston rod movement to slidingly accommodate the stationary shaft 30, which latter guides the crosshead as the piston rod reciprocates, so as to relieve the piston rod of any bending strains as the pullers 12 and 14 are forced outwardly by the action of toggle links 40. The piston rod is, of course, fixedly secured to the knuckle 42 formed integrally with and upon the crosshead 34.

The toggle links have pivoted connection with the pullers 12 and 14 at the locations 44, and are similarly connected to the crosshead at 46. The crosshead might operate satisfactorily without the aid of the guiding influence of shaft 30; however, in the preferred construction the shaft guides the crosshead as explained above because of the possibility that pullers 12 and 14 might meet with different degrees of resistance to outward movement, depending upon the difficulty with which the hide is stripped from opposite sides of the carcass. If the hide strips more easily from one side of the carcass than the other, the effect is to transmit bending to the piston rod, and this bending preferably is to be taken up by the shaft 30 rather than by the piston rod.

The guide shaft 30 may perform a secondary function, in addition to that mentioned above, of rigidly supporting or bracing the middle section of guide bar 20 to prevent flexation of the latter during initial projectile movement of the piston rod for moving the pullers outwardly. This is accomplished by fixing the shaft 30 to bar 20 at right angles, preferably through the backbone rest 10. For this purpose, the back rest may be provided with a transverse bore 48 in which the guide bar 20 is supported and fixed as by means of a pin or set-screw 50. The tendency of bar 20 to flex or bend as the pullers approach the outer limit of travel depicted in Fig. 2, is, of course, negligible. With further reference to the rigid shaft 30, it may be pointed out that said shaft is located directly beneath the piston rod 36, and is fixedly mounted upon the stationary frame member 28 in spaced parallelism with the piston rod. The shaft is spaced also from the frame member to permit sliding movement of the crosshead lengthwise of the shaft. In Fig. 2 the shaft 30 is not seen because it is covered by the piston rod 36 and crosshead 34.

The operation of the device is as follows: With the piston rod retracted to position the pullers 12 and 14 in close proximity to the back rest 10, a carcass 4 is brought into position with the backbone thereof disposed against the back rest 10 as shown. The hide flaps 6 and 8, previously stripped from the belly of the animal as hereinafter explained, are secured to the clamps 16 and 18 by the machine attendant, who then operates a valve, not shown, to introduce fluid under pressure into one end of cylinder 38 for advancing the piston rod 36 toward the back rest. Pursuant to the piston rod advancement, the toggle links 40 act to spread the pullers 12 and 14, causing them to move outwardly toward brackets 22—22 and thereby strip the hide from the carcass to the extent indicated by Fig. 2, wherein it is evident that the stripping action is nearly complete except as to that area along the backbone where the back rest contacts the carcass. Upon completion of the stripping action to the extent indicated, the clamps are manipulated to release the hide flaps 6 and 8, whereupon the carcass may be moved away from the apparatus by advancing it along the overhead conveyor from which the carcass is suspended. The attendant may then actuate the valve to retract the piston rod, thereby conditioning the apparatus for acceptance of another carcass to be stripped.

As the drawing indicates, the apparatus is very simple and comprises few mechanical parts on a frame of relatively small size, so that it may function within limited space requirements. Only one hydraulic cylinder with simple controls is needed, and the apparatus is capable of rendering highly efficient and economical service without expensive maintenance considerations. The frame of the apparatus may be either secured to the floor at the stripping station, or, if preferred, it may be tractionally supported to move with a continuously advancing carcass while performing the hide stripping operation.

The device is subject to various modifications and changes in the structural details thereof, within the scope of the appended claims, without departure from the spirit of the invention.

What is claimed is:

1. Apparatus for stripping the hide from an animal carcass suspended vertically by its legs, and having the hide preliminarily severed vertically along a belly slit to provide hide flaps at opposite sides of the slit, said apparatus comprising in combination, a frame including an elongate guide bar supported substantially horizontally upon the frame, a back rest secured to, carried by and located intermediate the ends of the guide bar to support the backbone area of the carcass, a pair of hide pullers secured to, carried by and slidable lengthwise along the guide bar, each including a clamp for attachment of a hide flap to each puller, and power actuated means having mechanical connection with the pullers for forcing the latter apart independently of the back rest, and simultaneously in opposite directions along the guide bar, for stripping the hide off the carcass from the belly slit toward the backbone of the carcass.

2. Apparatus for stripping the hide from an animal carcass suspended vertically by its legs, and having the hide preliminarily severed vertically along a belly slit to provide hide flaps at opposite sides of the slit, said apparatus comprising in combination, a frame including an elongate guide bar supported substantially horizontally upon the frame, a stationary back rest secured to, carried by and located substantially midway between the ends of the guide bar, a pair of hide pullers one on each side of said back rest, each of said pullers secured to, carried by and slidable lengthwise along the guide bar, each puller including means for gripping a hide flap, and reciprocative means for moving the pullers simultaneously in opposite directions along the guide bar on opposite sides of said back rest, for stripping the hide off the carcass from the belly slit toward the backbone thereof.

3. Apparatus for stripping the hide from an animal carcass suspended vertically by its legs, and having the hide preliminarily severed vertically along a belly slit to provide hide flaps at opposite sides of the slit, said apparatus comprising in combination, a frame including an elongate guide bar supported substantially horizontally upon the frame, a back rest located intermediate the ends of the guide bar to support the backbone area of the carcass, a pair of hide pullers slidable lengthwise along the guide bar, each including means for gripping a hide flap, a fluid pressure operated piston rod reciprocable relative to the frame in a direction transverse to the guide bar, a crosshead fixed to the piston rod for movement toward and from the back rest, and a pair of toggle links each having corresponding ends pivoted upon the crosshead, and opposite ends each connected to a hide puller, whereby upon reciprocation of the piston rod in one direction the hide pullers are slid toward the ends of the guide bar, and reciprocation thereof in the opposite direction slides the hide pullers toward the back rest.

4. Apparatus in accordance with claim 3, wherein the back rest is fixed to the guide bar intermediate the ends of the latter, and brace means is provided securing the back rest against movement relative to the frame.

5. Apparatus for stripping the hide from an animal carcass suspended vertically by its legs, and having the hide preliminarily severed vertically along a belly slit to provide hide flaps at opposite sides of the slit, said apparatus comprising in combination, a frame including an elongate guide bar supported substantially horizontally upon the frame, a back rest fixed to the guide bar substantially midway between the ends of the latter, an elongate brace member having opposite ends, one fixed to the back rest and the other fixed to the frame, said brace member extending substantially at right angles to the guide bar, a pair of hide pullers each slidable lengthwise along the guide bar from the back rest outwardly, gripping means on each hide puller to grasp a hide flap, a fluid pressure operated piston rod reciprocable relative to the frame in parallelism with the elongate brace member, a crosshead slidable upon the brace member and having a fixed mounting upon the piston rod for movement toward and from the back rest, and means on the crosshead translating reciprocatory movements of the piston rod to simultaneous outward and inward movements of the hide pullers relative to the back rest, at opposite sides of the latter.

6. Apparatus in accordance with claim 5, wherein the elongate brace member is at least as long as the piston rod stroke, and is arranged in spaced parallelism with the line of travel of said piston rod.

7. Apparatus for stripping the hide from an animal carcass suspended vertically by its legs, and having the hide preliminarily severed vertically along a belly slit to provide hide flaps at opposite sides of the slit, said apparatus comprising in combination, a back rest to support the backbone of the carcass, a pair of hide pullers, means supporting the hide pullers on opposite sides of said back rest and for simultaneous linear movement in opposite directions toward and from the back rest, hide gripping means on the adjacent portions of each hide puller to hold one of the flaps aforesaid, and motive means operatively connected to the hide pullers for shifting said pullers in the directions stated.

8. Apparatus for stripping the hide from an animal carcass suspended by its legs, and having the hide preliminarily severed vertically along a belly slit to provide hide flaps at opposite sides of the slit, said apparatus comprising in combination, a fixed back rest to support the backbone of the carcass, a pair of movable hide pullers, means guiding the hide pullers for straight line linear shifting in opposite directions toward and from the fixed back rest, hide gripping means on the adjacent ends of each hide puller to hold one of the flaps aforesaid, and power operated toggle means, operatively connected to the hide pullers for shifting the hide pullers simultaneously away from each other, and alternatively simultaneously toward one another in unison.

9. Apparatus for stripping the hide from an animal carcass suspended by its legs, and having the hide preliminarily severed vertically along a belly slit to provide hide flaps at opposite sides of the slit, said apparatus comprising in combination, a T-shaped frame having a pair of divergent arms each having a free end, a bracket at the free end of each arm arranged transversely thereof, an elongate guide bar spanning the brackets and having opposite ends each fixedly mounted upon a bracket, the arms, the brackets, and the guide bar being disposed in a horizontal plane, a back rest fixed to the guide bar substantially midway between the brackets, an elongate brace member having opposite ends, one fixed to the frame, and the other to the back rest, said brace member extending substantially at right angles to the guide bar, a pair of hide pullers each slidable lengthwise along the guide bar, one hide puller being slidable from the back rest toward one frame bracket, and the other being slideable from the back rest toward the other frame bracket, gripping means on each hide puller to grasp a hide flap, a fluid pressure operated piston rod reciprocable relative to the frame in parallelism with the elongate brace member, a crosshead fixed upon the piston rod for reciprocation therewith, and a pair of toggle links each having corresponding ends pivoted upon the crosshead, and opposite ends each pivotally connected to a hide puller, for shifting the hide pullers simultaneously upon reciprocation of the piston rod.

10. Apparatus in accordance with claim 9, wherein the elongate brace member is at least as long as the piston rod stroke, and carries the crosshead slidably to assume any bending strain directed at the piston rod.

References Cited in the file of this patent

UNITED STATES PATENTS

| | | |
|---|---|---|
| 1,908,311 | Branick | May 9, 1933 |
| 2,461,466 | Coad | Feb. 8, 1949 |
| 2,589,771 | Campbell et al. | Mar. 18, 1952 |
| 2,696,633 | Hincks | Dec. 14, 1954 |
| 2,727,718 | Branick | Dec. 20, 1955 |
| 2,732,174 | Kossman | Jan. 24, 1956 |